Jan. 2, 1968  R. F. RENSVOLD  3,361,203

SELF-CLEANING SAND SCREEN

Filed Oct. 22, 1965

ROGER F. RENSVOLD
INVENTOR.

BY Lyon & Lyon
ATTORNEYS

United States Patent Office 3,361,203
Patented Jan. 2, 1968

3,361,203
SELF-CLEANING SAND SCREEN
Roger F. Rensvold, Duncan, Okla., assignor to Halliburton Company, Duncan, Okla., a corporation of Delaware
Filed Oct. 22, 1965, Ser. No. 501,805
18 Claims. (Cl. 166—12)

This invention relates to a new and improved well sand screen and to a method of manufacturing said screen. More particularly, this invention relates to a self cleaning sand screen having an outer layer which can be removed upon becoming clogged while the screen remains in place in a well formation.

Prior art sand screens such as those described in U.S. Patent 2,843,209 to Degen consist essentially of a cylinder of sand particles bonded together by a thermosetting resin around a slotted tubing or mandrel. The cylinder of sand thus filters liquids entering the mandrel from a surrounding well formation.

One disadvantage from the prior art sand screens is that they become plugged with materials from the well formation, thus cutting down on the flow through the screen. Frequently, the greatest amount of damage to the sand screen through plugging by foreign matter occurs during the installation of the screen. For example, it is often necessary to load a well with drilling mud to control high pressure zones during the installation of the well pipe and sand screen. The drilling mud forms a filter cake which plugs permeable media in the formation, thus preventing the loss of fluids to "thief" formations in the well. However, the drilling mud may also tend to plug the sand screen thus greatly reducing its permeability and severely limiting its effectiveness.

It is thus an object of the present invention to provide a sand filter which is capable of having its permeability restored.

It is a further object of the present invention to provide a method for increasing the permeability of a sand filter whose permeability has been impaired due to clogging at its outer surface.

It is still a further object of this invention to provide a novel sand filter composition which may be removed from the main sand filter in situ.

These and other objects can be accomplished by means of the novel filter and filter cleaning method of this invention. The filter cleaning method of this invention comprises removing from the sand filter an outer layer of reduced permeability due to clogging with foreign matter such as drilling mud, etc. Removing this outer layer exposes a clean inner layer of the sand filter which has not been contacted by the clogging materials.

The nature of this invention can be more fully understood by reference to the following drawings wherein.

Figure 1:
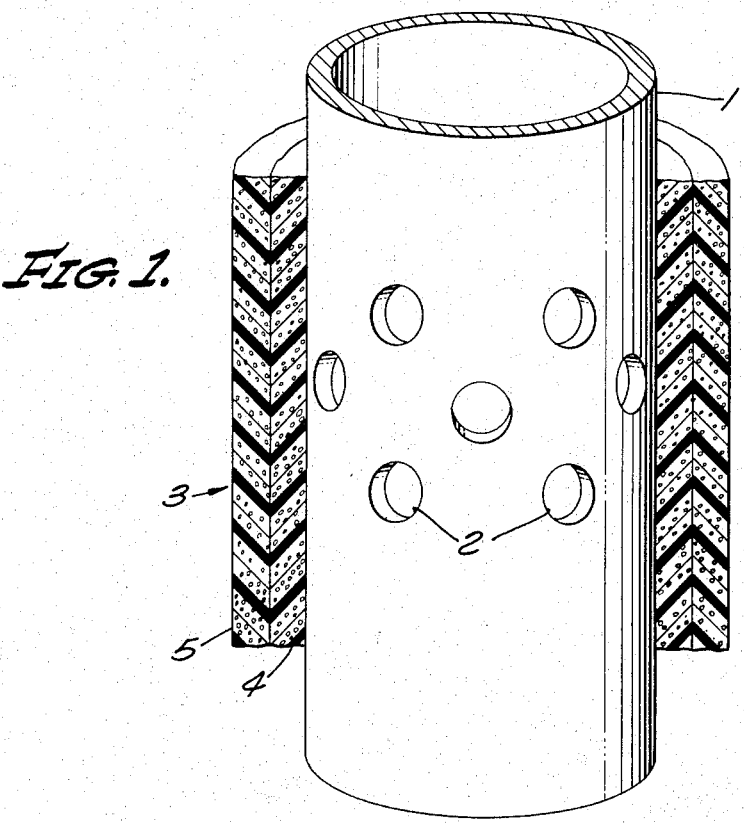
FIGURE 1 is a longitudinal view of a mandrel showing the sand screen having a removable outer layer.

FIGURE 1 illustrates a section of a mandrel 1. The mandrel has perforations 2 in the production zone. Surrounding the perforated mandrel is a sand screen generally indicated at 3. This general structure is well-known in the prior art and many minor variations may be made according to prior art techniques. Inner annulus 4 of the sand screen is a typical prior art sand screen. A highly satisfactory material for this screen is, for example, Ottawa sand ranging in size between about 20 and 40 mesh. The sand is bonded by a thermo-setting resin such as an epoxy resin or any other suitable binder. The sand screen 4 may be uniform or it may comprise several layers containing different binders and sand. According to the present invention, the second annular layer 5 comprises a material which may be readily removed by one of several processes. Removal is accomplished when the annular layer 5 has become so clogged with foreign material that the permeability of sand screen 3 is greatly reduced, thus reducing the productivity of the well.

Figure 2:
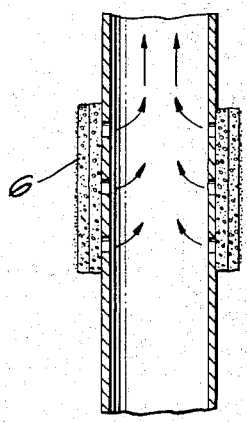
FIGURE 2 is a sectional view of a mandrel and sand screen wherein the sand screen has become clogged on its outer surface by foreign matter.

FIGURE 2 illustrates a producing well. The arrows represent the flow of oil or other liquid product. A zone of reduced permeability is indicated at the outer surface of the sand screen 6. The reduced permeability or clogging may be due to several factors. For example, in the normal course of production, fluid entering the sand screen will carry with it foreign matter which is of a small size so that it will become embedded in the interstices of the sand screen. Some of this foreign matter will tend to act as a further filtering means, however, other particles are of such a nature that they tend to clog the screen and reduce permeability. Normally, the clogging of sand screen during porduction occurs rather slowly and is not a serious problem. It has been found, however, that a great deal of clogging occurs during the initial operation of the well. This is due to the presence of drilling mud and other foreign matter present at the outset of the production operation. Further clogging may occur when the sand screen is positioned in the bore hole due to scraping of the outer surface of the sand screen against material in the wall of the bore hole which will tend to cause clogging.

Figure 3:
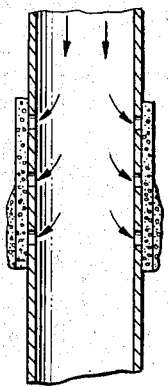
FIGURE 3 is a sectional view of a mandrel having a sand screen with its permeability restored.

FIGURE 3 represents a preferred method for restoring the permeability of the sand screen according to this invention. When the sand screen has become clogged so that the permeability and resulting production of the well are reduced to an undesirably low point, the outer layer of the sand screen, wherein the major portion of the clogging materials are located, is removed by treating the sand screen with a material which will weaken the binder of the outer layer thus allowing it to be flushed away by backwashing the well. In FIGURE 3 a major portion of the outer layer of the sand screen which contains the clogging materials has been removed by the action of the backwashing materials, containing the binder weakening ingredient, as indicated by the arrows. The outer layer 5 must initially be strong and resistant to abrasion in order that the sand screen can be placed in the bore hole. If the outer layer were fragile and susceptible to being washed away, it might be removed before installation of the mandrel in the bore hole was completed. However, upon treatment with a material which will weaken the binder of the outer layer, the outer layer becomes so weakened that it may be easily removed such as by flushing as indicated in FIGURE 3. Other methods of removal of the weakened outer layer may also be employed. For example, the mandrel may be vigorously reciprocated in the bore hole so that the weakened outer layer is sluffed off by contact with the walls of the bore hole.

According to the present invention, it is also possible to produce a sand screen that affords an operator an effective choice of production rate after the screen has been installed. This can be accomplished by making the two layers of the sand screen of this invention of different particle size, the finer sand on the outer layer. Then, if it were desired to increase production rates at a reduction of screening efficiency, a sample backflush procedure would provide a screen with a higher flow capacity. The backflush would remove the outer layer of finer sand. The remaining layer of coarse sand would thus have a higher production rate although this higher rate would be accompanied by a lower screening efficiency.

Two important requirements of the outer sand screen layer binder are: first that the binder must remain intact under ordinary conditions and in the presence of fluids normally present in the bore hole during installation of the mandrel and associated sand screen so that the outer layer does not crumble away during installation; and second that the binder shall become so weakened on contact with a material used in the backflow operation that it may be easily sluffed off by backwashing. Any combination of binder and backwashing material which will accomplish these objectives may be suitably used and is within the scope of this invention.

Binders which meet the requirement of being strong and yet soluble or weakened by a material which can conveniently be used in a backwashing solution include water soluble glues, which upon setting, offer a moderate amount of resistance to degradation by immersion in water. Thus, exposure to small amounts of incidental water which may be found in the bore hole would not cause disintegration of the outer layer, but a reasonably sustained contact with the water would cause degradation of the glue with the concomitant crumbling of the outer layer and removal of the clogging materials. Film forming materials which are soluble in the constituents of crude oil may also be acceptable binders for this invention. Typical of such materials is natural latex. A preferred binder is one which is soluble in or weakened by a substance which is not normally present in the well formation. Thus, binders soluble in a material such as acid, for example, are particularly suitable for this invention. Binders which are soluble in acid are, for example, furfuryl alcohol, urea formaldehyde and sodium silicite solutions. The binder, in addition to having the above-mentioned properties, should be tough and elastic to prevent damage to the screen when it is being installed.

The suitability of various sand screen compositions for the present can be initially determined by the following procedure.

EXAMPLE I

The basic test used to ascertain the suitability of all binder material was the compressive strength of 2 x 2 x 2 inch cubes before and after being subjected to hot water and hydrochloric acid. In all cases, 20 to 40 mesh, Ottawa sand was used to make the test cubes. Fifteen blocks were made according to the following procedure:

(1) Sodium silicate (40° baume') _____part__ 1
    Sand _____do____ 10
(2) Urea formaldehyde resin (UF-85, Allied Chemical Co. containing 85% solids)
    _____grams__ 132
    Urea _____do____ 472
    Water _____do____ 137
    $NH_4Cl$ _____do____ 11
    Sand _____kilograms__ 3

(3) Urea formaldehyde resin (UF-85, Allied Chemical Co.) _____kilograms__ 132
    Urea _____do____ 47.2
    Water _____do____ 20
    $NH_4Cl$ _____do____ 10
    Silane A-1100 (gamma aminopropyl triethoxy silane _____do____ 10
    Sand _____kilograms__ 3
(4) Urea formaldehyde resin (UF-85, Allied Chemical Co.) _____grams__ 132
    Urea _____do____ 47.2
    Water _____do____ 20
    $NH_4Cl$ _____do____ 10
    Sand _____kilograms__ 3
(5) Casein _____grams__ 100
    $Ca(OH)_2$ _____do____ 30
    $Na_2CO_3$ _____do____ 10
    Sand _____kilograms__ 3
(6) Sodium silicate _____grams__ 200
    Sand _____kilograms__ 3
    Water _____grams__ 150
(7) Urea formaldehyde resin (Resimene 970, Monsanto Chemical Co.) _____do____ 30
    Water _____do____ 150
    Sand _____kilokrams__ 3
(8) UF-85 _____grams__ 139
    Urea _____do____ 0.14
    $NH_4Cl$ _____do____ 4.20
    Water _____do____ 25.4
    Sand _____kilograms__ 3
(9) Resimene 970 _____grams__ 120
    Water _____do____ 150
    Sand _____kilograms__ 3
(10) Melamine formaldehyde resin (Cymel 430, Allied Chemical Co.) _____grams__ 120
    Water _____do____ 150
    Sand _____kilograms__ 3
(11) Urea formaldehyde resin (Resimene 819, Monsanto Chemical Co.) _____grams__ 300
    Butanol _____do____ 10
    Water _____do____ 190
    Sand _____kilograms__ 3
(12) Resimene _____grams__ 120
    Water _____do____ 150
    Sand _____kilograms__ 3

The cubes obtained were immersed in various fluids for a given period of time and then their compressive strengths were determined. Table I below indicates the results.

It can be seen that various combinations of binder and backwash produced favorable results. For example, low binder strength was obtained by treating urea formaldehyde with hot tap water as in test block No. 7 or with hydrochloric acid as in test block No. 11; treatment of a furfuryl alcohol urea formaldehyde mixture with hydrochloric acid as in test block No. 8 and treatment of sodium silicate with hot water.

The effect of various other materials such as acetic acid, brine, halogenated hydrocarbons and crude oil on a binder is illustrated by the following example.

EXAMPLE II

Test screens were prepared by molding cylinders from 100 parts of 20-40 mesh Ottawa sand with one of the five resin formulas indicated below and then curing for 2 hours at 400° F. The five resin formulas tested were:

TABLE I

| Test Block | Cure Time, hrs. | Schedule Temp., °F. | Test Condition | Compressive Strength, p.s.i. |
|---|---|---|---|---|
| 1 | 5 | 250 | No immersion | 7,200 |
|   | 5 | 250 | Tap water | 5,438 |
|   | 5 | 350 | No immersion | 5,150 |
|   | 5 | 350 | Tap water | 4,092 |
| 2 | 4½ | 150 |  | (1) |
| 3 | 3 | 150 | No immersion | (1) |
| 4 | 2 | 160 | ...do... | 896 |
| 5 | 3½ | 250 | ...do... | 1,925 |
| 6 | 2 | 250 | ...do... | 3,547 |
|   |   |   | Hot water for 1 hour | 0 |
| 7 | 2 | 350 | No immersion | 812 |
|   |   |   | Tap water 13 hours | 802 |
|   |   |   | Tap water 13 hours 160° F | 19 |
|   |   |   | Tap water 120° F | 262 |
| 8 | 1 | 450 | No immersion | 2,850 |
|   |   |   | Tap water 13 hours room temp | 719 |
|   |   |   | Tap water 13 hours 100° | 611 |
|   |   |   | Tap water 13 hours 140° | 482 |
|   |   |   | 15% HCl 13 hours room temp | 48 |
|   |   |   | 15% HCl 13 hours 100° F | 50 |
|   |   |   | 15% HCl 13 hours 120° F | 37 |
|   |   |   | 15% HCl 13 hours 140° F | 30 |
| 9 | 2 | 400 | No immersion | 1,351 |
| 10 | 2 | 400 | ...do... | 3,033 |
|   |   |   | Tap water 2 hours boiling | 1,604 |
| 11 | 2 | 400 | No immersion | 4,658 |
|   |   |   | Tap water 13 hours room temp | 3,442 |
|   |   |   | Tap water 13 hours 140° F | 2,546 |
|   |   |   | Tap water 13 hours 160° F | 2,504 |
|   |   |   | 5% HCl 13 hours room temp | 220 |
|   |   |   | 15% HCl 13 hours 120° | 26 |
|   |   |   | 15% HCl 13 hours 140° | 26 |
|   |   |   | Tap water 2 hours boiling | 2,250 |
| 12 | 2 | 350 | No immersion | 6,908 |
|   |   |   | Tap water 13 hours room temp | 865 |
|   |   |   | Tap water 13 hours 100° F | 872 |
|   |   |   | Tap water 13 hours 120° F | 2,867 |

[1] No strength after cure.

(1) Epon 828 [1] 100 parts and DETA,[2] 8 parts.
(2) Epon 828 100 parts and Genamid [3] 250 100 parts.
(3) Epon 1001 [4] 100 parts.
(4) Epon 828 100 parts catalyst Z [5] 20 parts A-1100 silane 1 part.
(5) Epon 828 100 parts Genamid 250 50 parts.

The results are shown in Table II.

TABLE II.—IMMERSION TEST RESULTS

| Immersion Test Fluid | Immersion Conditions | | Compressive Strength, p.s.i. | | | | |
|---|---|---|---|---|---|---|---|
|  | Time, hrs. | Temp., °F. | 1 | 2 | 3 | 4 | 5 |
| Dry |  | RT | 5,321 | 2,598 | 1,617 | 6,645 | 6,249 |
| Tap Water | 24 | 170 |  | 612 |  |  |  |
| Brine | 24 | RT |  | 446 |  |  | 4,327 |
|  | 24 | 170 |  | 446 |  |  |  |
|  | 24 | 140 |  |  |  | 3,590 | 3,464 |
|  | 24 | 180 |  |  |  | 3,759 | 2,457 |
| 15% HCl | 24 | RT |  |  |  |  | 3,813 |
|  | 24 | 170 |  | 128 |  |  |  |
|  | 24 | 140 |  | 169 |  | 4,246 | 1,113 |
|  | 24 | 180 |  |  |  | 2,849 | 751 |
| 10% Fe-1A* | 24 | RT |  |  |  | 4,344 | 409 |
|  | 24 | 140 |  |  |  | 3,536 | 280 |
|  | 24 | 180 |  |  |  | 2,913 | 301 |
| 30% Fe-1A | 24 | RT |  |  |  | 4,825 | 77 |
|  | 24 | 140 |  |  |  | 4,192 | 26 |
|  | 24 | 180 |  |  |  | 3,322 | 0 |
| 100% Fe-1A | 2 | RT | 2,896 | 0 | 34 | 5,011 |  |
|  | 24 | RT |  |  |  |  | 0 |
|  | 24 | 140 |  |  |  | 4,950 |  |
|  | 24 | 180 |  |  |  | 2,666 |  |
| 50% Acetic Acid | 24 | RT |  |  |  |  | 0 |
|  | 24 | 140 |  | 0 |  | 4,016 | 0 |
|  | 24 | 180 |  |  |  | 2,730 | 0 |
| Methylene Chloride-Diesel Oil(1:1) | 2 | RT | 3,576 | 57 | 82 | 4,896 |  |
|  | 24 | 170 |  | 66 |  |  |  |
| Trichloroethylene | 2 | RT | 5,830 | 39 | 68 | 4,835 |  |
| Trichloroethylene-Fe-1A Acid (1:1) | 2 | RT | 4,321 | 0 | 16 | 5,193 |  |
| Trichloroethylene-Diesel Oil(1:1) | 24 | 140 |  | 71 |  |  |  |
| Redfork Crude Oil | 24 | RT |  |  |  |  | 4,456 |
|  | 24 | 140 |  |  |  |  | 4,233 |
|  | 24 | 170 |  | 308 |  |  |  |
|  | 24 | 180 |  |  |  |  | 2,033 |

*Acetic acid concentrate (60% acetic anhydride and 40% glacial acetic acid).

[1] An epoxy resin made by Shell Chemical Corp. The resin is a homologue of diglycidyl ether of bisphenol A. It is a liquid at room temperature, with an epoxide equivalent of from 175–210, an average molecular weight of 350–400, and a viscosity of from 5,000–15,000 centipoises at 25° C.

[2] A diethylene triamine catalyst, a highly reactive primary and secondary amine; having a molecular weight of 103; and viscosity of 7 centipoises at room temperature.

[3] Curing agent comprising a condensation polymer of vegetable oil, unsaturated fatty acids, an aryl or alkyl polyamines made by General Mills Co.

[4] An epoxy resin made by Shell Chemical Corp. The resin is a diglycidyl ether of bisphenol epichlorhydrin in a butyl carbitol solvent. The resin has an epoxide equivalent (weight of resin in grams which contain 1 gram chemical equivalent of epoxy) of 450–525; an average molecular weight of 900–1000; a viscosity at 25° C. on the Gardner-Holdt scale of C–G; a melting point of 64° C.–76° C. under Duran's method; and a color value of 8 at 25° C. under the Gardner method.

[5] Aromatic polyamine curing agent for Epon 828 made by Shell Chemical Corp.

It can be seen that the strength of formulations Nos. 2 and 3 can be reduced by treatment with hydrochloric acid, acetic acid, and halogenated hydrocarbons. Formulation No. 5 also can be effectively weakened by treatment with acetic acid and hot hydrochloric acid.

The improvement in permeability of a sand screen obtained by the present invention is illustrated by the following example.

EXAMPLE III

A sand screen according to this invention was prepared by the following method. The permanent inner layer was prepared by blending 20–40 mesh Ottawa sand with Epon 828 resin catalyzed with 20 parts per 100 of Catalyst Z and containing one part per 100 of A–1100 Silane. The ratio of 4 parts resin to 100 parts sand by weight was used. The mold produced a 2-inch-tubing having a thickness of 0.75 inch. The layer was baked at 250° overnight. The second layer or outer layer was prepared by tamping 68.35 grams of resin wet sand on the surface of the first layer and curing at the same temperature and time. The second layer was consolidated with Epon 828 (70% by weight), Genamid 250 (30% by weight) mixture, using the same resin-ratio as before.

A plugging material was made by mixing equal parts of drilling mud bentonite, colloidal kaolin, silica flour, WAC–9 (silica flour (finely divided crushed silicon dioxide); specific gravity 2.64), #1 Oklahoma—dry sand and 40–60 mesh Ottawa sand and added to diesel fuel to form a 50% slurry.

The test cylinder was plugged with the mixture by placing approximately 300 grams of this slurry against the outer surface under hydraulic pressure up to 1,000 p.s.i.g. The cylinder was then backflushed to remove all loose plugging material not adhering to the sand face and subsequently, contacted with acetic acid and allowed to stand overnight at room temperature. The cylinder was then backflushed with tap water for 12 minutes at a slow rate of 8.37 gallons per minute or an approximate total volume of 100 gallons. Full capacity tests were run with the following results.

*Experimental results*

The flow capacity of the test cylinder after each stage of treatment is tabulated below.

| Pressure, p.s.i.g. | Flow Rate, Water, g.p.m. | | |
|---|---|---|---|
| | Original | After Plugging and Water Backflush | After Fe–1A Soak and Water Backflush |
| 10 | 1.67 | 1.97 | 3.60 |
| 20 | 3.73 | 3.61 | 5.59 |
| 30 | 5.22 | 4.67 | 7.25 |
| 40 | 5.91 | 5.62 | 8.76 |
| 50 | 6.37 | 6.29 | |

I claim:
1. A well screen comprising a mandrel having a plurality of openings therein, a first layer of sand screen bonded on said mandrel, said first layer comprising sand and a permanent binder, and a second layer of sand screen bonded to said first layer said second layer comprising sand and a semipermanent binder, said semipermanent binder being stable under normal conditions of use, but unstable when subjected to controlled in situ treatment, said permanent binder being stable under said in situ treatment.

2. The well screen device of claim 1 wherein said in situ treatment comprises backflushing said sand screen with a reagent which substantially weakens said semipermanent binder that has no effect on said permanent binder.

3. The sand screen of claim 1 wherein said in situ treatment comprises scraping said outer layer of sand screen against the wall of a bore hole.

4. The well screen of claim 1 wherein said semipermanent binder comprises a water soluble epoxy resin.

5. The sand screen of claim 1 wherein said semipermanent binder comprises an acid soluble epoxy resin.

6. The sand screen of claim 1 wherein said semipermanent binder comprises a water soluble urea formaldehyde resin.

7. The sand screen of claim 1 wherein said semipermanent binder comprises an acid soluble urea formaldehyde resin.

8. The sand screen of claim 1 wherein said semipermanent binder comprises sodium silicate.

9. A method of increasing the permeability of a sand screen having two layers, an inner layer and an outer layer, said outer layer comprising sand in a semipermanent binder, said inner layer comprising sand in a permanent binder which comprises contacting said sand screen with a reagent which will substantially weaken said semipermanent binder but which will have essentially no effect on said permanent binder.

10. The method of claim 9 wherein the outer layer of sand screen is then removed by reciprocating said mandrel within said well formation.

11. The method of claim 9 wherein the sand screen is treated by said reagent by flowing said reagent down the mandrel and through the sand screen into the well formation.

12. The method of claim 11 wherein said reagent is an acid and said binder is an acid soluble resin.

13. The method of claim 11 wherein said semipermanent binder is an epoxy resin and said reagent is a halogenated hydrocarbon.

14. The method of claim 11 wherein said reagent is water and said semipermanent binder is a substantially water soluble resin.

15. The method of claim 14 wherein said water soluble binder is urea formaldehyde.

16. The method of claim 11 wherein said semipermanent binder comprises an acid soluble epoxy resin and said reagent is an acid.

17. The method of claim 16 wherein said acid is hydrochloric acid.

18. The method of claim 16 wherein said acid is acetic acid.

References Cited

UNITED STATES PATENTS

| 2,401,035 | 5/1946 | Akeyson et al. | 166—205 |
| 2,981,333 | 4/1961 | Miller et al. | 166—208 X |
| 3,044,547 | 7/1962 | Jarboe | 166—12 |
| 3,195,226 | 7/1965 | Valyi | 210—496 X |
| 3,268,001 | 8/1966 | Brandt | 166—12 |
| 3,273,641 | 9/1966 | Bourne | 166—12 |
| 3,299,831 | 1/1967 | Watson et al. | 166—228 X |

FOREIGN PATENTS

| 1,020,910 | 11/1952 | France. |
| 144,802 | 4/1962 | U.S.S.R. |

CHARLES E. O'CONNELL, *Primary Examiner.*

DAVID H. BROWN, *Examiner.*